July 29, 1930.  J. WATTMANN  1,771,472
METHOD OF ALUMINO THERMIC WELDING
Filed Sept. 20, 1929
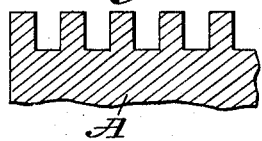
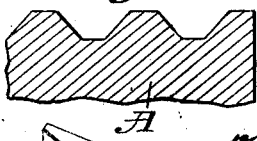
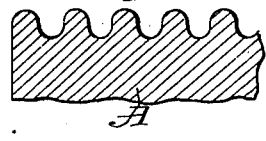
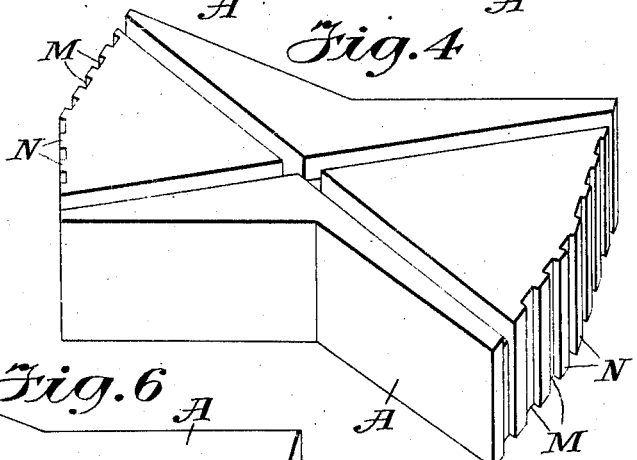
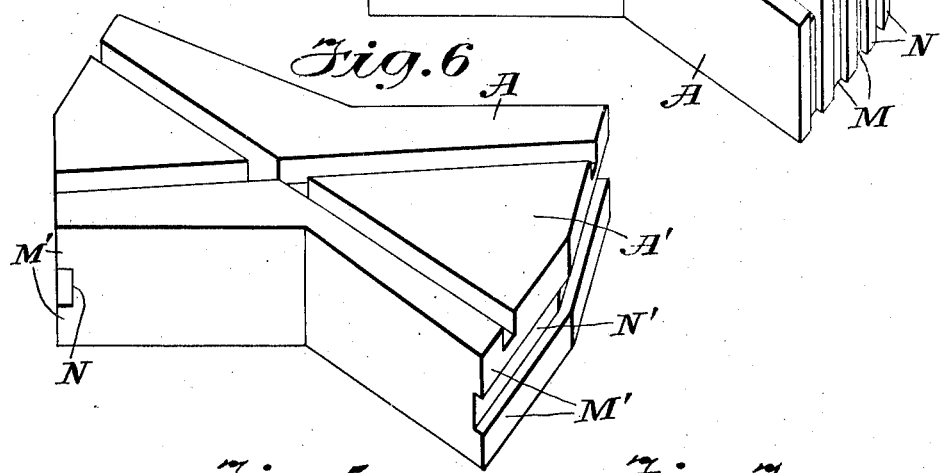
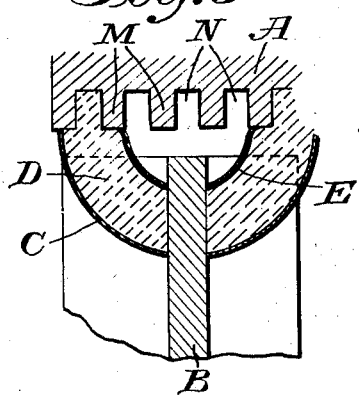
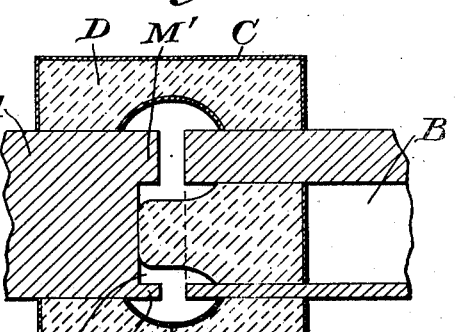
INVENTOR
John Wattmann
BY
HIS ATTORNEY

UNITED STATES PATENT OFFICE

JOHN WATTMANN, OF BERLIN-LANKWITZ, GERMANY

METHOD OF ALUMINO-THERMIC WELDING

Application filed September 20, 1929, Serial No. 393,909, and in Germany October 16, 1928.

The invention relates to the alumino-thermic welding of metal sections of different sizes and profiles, as, for example, the uniting of ends of railway rails to relatively heavy crossover blocks or units, which are usually formed of large castings or forgings; and has for its object the provision of means, preferably in the form of suitable grooving in the abutting face or faces of the larger sections, which will provide a more extensive contact area for the preheating medium and also for the superheated molten metal, resulting from the alumino-thermic reaction, which is teemed into the mold to effect the weld.

Typical modes of carrying the invention into effect are illustrated in the accompanying drawings, in which:—

Figs. 1, 2 and 3 are fragmentary cross sections of the grooved abutting faces of the larger elements or units to be welded to smaller sections or units of different profiles.

Fig. 4 is a perspective view of a crossover block or unit employed in railroad work showing the faces to which the rail ends are to be welded provided with one type of grooving.

Fig. 5 is a fragmentary horizontal section of the unit shown in Fig. 4 with the abutting rail end and the mold disposed in operative relation.

Fig. 6 is a view similar to Fig. 4 showing another type of grooving applied to the ends of the crossover block or unit.

Fig. 7 is a sectional elevation of the mold enclosing the end of the rail and the adjacent portion of the crossing unit, the parts being assembled to receive the superheated molten metal which effects the weld.

In alumino-thermic welding, the general tendency thus far, has been to limit operations to the welding of bars or rod-like pieces of approximately similar cross sections and shapes, such as railway rails, structural iron and steel beams, tubes and the like. In the alumino-thermic repair welding of broken parts or elements, the same conditions apply, as the abutting faces at the fracture necessarily register when brought into juxtaposition within the mold, and no particular difficulty is encountered in preheating the parts to be welded or in obtaining a proper disposition of the superheated molten metal to effect a substantially homogeneous weld. However, when it has been attempted to alumino-thermically weld pieces of dissimilar contours, cross sections and sizes, as, for example, the end of a bar or rail to a relatively large unit, the results have been generally unsatisfactory, first, because it has been impossible to uniformly preheat both of the parts or elements to be welded to the desired temperature because the larger element could not be raised to the desired temperature, while the smaller element to be welded thereto would frequently be overheated. Furthermore, it usually happened that the superheated molten metal to effect the weld would completely fuse the portion of the smaller element enclosed within the mold, but would not raise the juxtaposed surface of the larger element to fusion temperature necessary to effect a homogeneous weld.

According to the present invention, pieces of various kinds and sizes, such as relatively thin walled profile sections and large surfaced heavy metal sections may be effectively and uniformly welded by the alumino-thermic process, by enlarging the welding surface of the larger element by providing said surface with suitable grooving, so that the preheating medium and also the superheated molten metal engaging these enlarged surfaces of a relatively large body or work piece effects a substantially uniform and equable preheating of the same as compared with preheating of the smaller sections to be welded, and likewise the molten metal to effect the weld will engage a sufficiently large area formed by the grooving to produce an effective union of the two parts or pieces. In other words, the providing of the welding surface of the larger unit or element with grooving and with resultant ridges or ribs provides an enlarged area of surface contact for the preheating medium and also for the weld forming molten metal.

It will be understood that the particular shape or configuration of the grooving and the relative location thereof with respect to the juxtaposed element to be welded will depend largely on the shape and character of the two parts to be welded, and, in most cases, even if the actual welding does not extend throughout the entire superficial area of the grooving and the ribs or ridges resulting therefrom, nevertheless the interlocking of the welding metal, when the latter cools with the grooving, will produce an effective joint.

The invention is particularly applicable to welding of ends of railway rails to crossing blocks or units, which are usually made of relatively large cast or forged sections. When these crossing units are formed as castings, it has been the common practice to provide the same with integral rail butts having the same cross sectional area and configuration as the rails to be welded thereto. This form of crossing unit, however, is subject to the objection that it is unnecessarily heavy and cumbersome and quite expensive to produce, as separate and individual block or units must be designed for each particular crossing and each different size of railway rail.

The present invention obviates these difficulties, in that it renders possible the use of crossing blocks or units formed of uniform shapes and sizes without the usual rail butt projections and without the preformed grooves for aligning with the grooves in the rails, as the cross grooves in the unit may be formed after the rails have been welded to the units.

In many instances, the face of the larger element or section, as, for example, the crossover unit, which face constitutes the welding surface, may be provided with a series of grooves or channels with resulting interposed ribs, either vertical or horizontal, as illustrated in Figs. 1, 2 and 3, thereby providing the necessary enlarged surface contact area for the preheating medium and also for the molten metal, by means of which the weld is effected and which quickly raises the relatively small bodies of the ribs to welding temperature.

In Fig. 4, there is illustrated a typical example of a crossing block or unit for street railways, which is standard for relatively acute angled track intersections, within certain limits. The body of the unit A may be either cast or forged in any desired shape or size, and the end surfaces thereof to which the rail ends are to be welded are provided with a series of vertical grooves and ridges M and N, as indicated, so that, when the crossing unit is interposed in proper position in the track intersection, the end of each abutting rail and the adjacent grooved surface of the crossing unit may be enclosed in a mold, as illustrated in Fig. 5, in which A represents the crossing unit, M and N the ribs and grooves therein, B the rail, C the mold box, D the body of refractory material forming the mold proper, and E a lining of sheet iron or similar material which defines the inner surface of the mold cavity. With this particular arrangement of parts, it will be apparent that a substantially uniform preheating of the surfaces of the parts to be welded may be readily effected by the introduction of a suitable preheating medium, such as the flame of a blow torch, into the mold cavity, after which the superheated molten metal to effect the weld is teemed into the mold and, coming in contact with the parts of the rail within the mold and the juxtaposed ribs and grooves of the crossing unit, raises the parts to welding temperature and produces a substantially uniform weld, the interlocking of the cast metal with the groove and ridges materially strengthening the joint. After the ends of the rails have been welded to both ends of the crossing unit, the grooves may be formed in the top surface of the crossing unit to align with the grooves in the rails by any suitable mechanism. It will be seen, therefore, that by the application of the method of the invention, it will be possible to use a standard crossing unit for crossings of various angularity and, while the particular exemplification of the unit indicates one for varying acute angled crossings, it will be understood that the same type of unit may be employed for rectangular crossings without departing from the invention.

In certain cases, it may be of advantage to provide the rail end abutting faces of the crossing unit with a single horizontally disposed groove, as illustrated in Figs. 6 and 7, in which A' represents the crossing unit with a horizontally disposed groove N' formed in each end face thereof, the groove preferably corresponding in height to that of the web of the rail, so that the upper and lower ribs or flanges M' will be opposed to the end faces of the heads and bases of the rails, as indicated in Fig. 7, in which A represents the crossing unit, B the end of the rail to be welded thereto, C the mold box, D the body of refractory material forming the mold proper, and, if desired, a lining E of sheet iron or the like. In this particular case, inasmuch as it is not necessary to effect a weld between the web of the rail and the crossing unit, the refractory material forming the mold may be extended into and substantially fill the space between the rail web and the adjacent face of the crossing unit. In this particular application of the invention, the weld is formed between the head and base of the rail and the adjacent face of the crossing unit and, as the juxtaposed faces are of approximately the same area, it will be apparent that they may be substantially and uniformly preheated and also brought to substantial and uniform welding temperature, when the alumino-thermic metal is teemed into the mold.

What I claim is:

1. The method of welding dissimilar metal elements of larger and smaller cross sections, which comprises enlarging the welding surface of the abutting face of the larger section, juxtaposing the faces of the elements to be welded in a mold, and teeming superheated molten metal into the mold.

2. The method of welding dissimilar metal elements of larger and smaller cross sections, which comprises grooving the abutting face of the larger section, juxtaposing the faces of the elements to be welded in a mold, and teeming superheated molten metal into the mold.

3. The method of welding dissimilar metal elements of larger and smaller cross sections, which comprises grooving the abutting face of the larger section, juxtaposing the faces of the elements to be welded in a mold, preheating the parts enclosed in the mold, and teeming superheated molten metal into the mold.

4. The method of welding the ends of railway rails to crossing units, which comprises enlarging the welding surfaces of the rail abutting faces of the unit and casting superheated molten metal about the abutting rail ends and the unit faces.

5. The method of welding the ends of railway rails to crossing units, which comprises grooving the rail abutting faces of the unit and casting superheated molten metal about the abutting rail ends and the grooved faces.

6. The method of welding the ends of railway rails to crossing units, which comprises providing the abutting faces of the unit with a series of parallel grooves with intervening ribs, and casting superheated molten metal about the abutted rail ends and the grooved faces.

In testimony whereof I affix my signature.

JOHN WATTMANN.